(12) United States Patent
Yoshino et al.

(10) Patent No.: US 11,509,354 B2
(45) Date of Patent: Nov. 22, 2022

(54) VEHICLE CONTROL APPARATUS

(71) Applicant: SUBARU CORPORATION, Tokyo (JP)

(72) Inventors: Masakazu Yoshino, Tokyo (JP); Fumiyuki Moriya, Tokyo (JP); Takuma Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 187 days.

(21) Appl. No.: 16/912,174

(22) Filed: Jun. 25, 2020

(65) Prior Publication Data

US 2021/0083723 A1 Mar. 18, 2021

(30) Foreign Application Priority Data

Sep. 13, 2019 (JP) .............................. JP2019-166808

(51) Int. Cl.
| | |
|---|---|
| *H04B 5/00* | (2006.01) |
| *H02J 7/00* | (2006.01) |
| *H02J 7/02* | (2016.01) |
| *H02J 50/90* | (2016.01) |
| *B60K 35/00* | (2006.01) |

(Continued)

(52) U.S. Cl.
CPC .......... *H04B 5/0037* (2013.01); *B60K 35/00* (2013.01); *H01M 10/44* (2013.01); *H02J 50/10* (2016.02); *H04B 5/0075* (2013.01); *B60K 2370/1529* (2019.05); *B60K 2370/16* (2019.05); *B60K 2370/21* (2019.05)

(58) Field of Classification Search
None
See application file for complete search history.

(56) References Cited

U.S. PATENT DOCUMENTS

| 7,271,569 B2 * | 9/2007 | Oglesbee | .............. | H02J 7/0044 |
| | | | | 320/108 |
| 7,495,414 B2 * | 2/2009 | Hui | ........................ | H01F 38/14 |
| | | | | 320/108 |

(Continued)

FOREIGN PATENT DOCUMENTS

| JP | 2013-207819 A | 10/2013 |
| JP | 2015-129753 A | 7/2015 |
| JP | 2016-077023 A | 5/2016 |

*Primary Examiner* — Tuan A Tran
(74) *Attorney, Agent, or Firm* — McGinn IP Law Group, PLLC

(57) ABSTRACT

A vehicle control apparatus is to be provided in a vehicle including a wireless charger that charges a mobile device placed on the wireless charger. The vehicle control apparatus includes an interruption detector, a cause determination unit, and a notification controller. The interruption detector detects interruption of charging of the mobile device by the wireless charger, based on an operating state of the wireless charger. The cause determination unit determines whether a cause of the interruption of the charging is a first or second cause. The first cause is that the mobile device is moved by inertia during traveling. The second cause is that the mobile device is moved by a passenger. When the cause is determined as being the first cause, the notification controller notifies information about the interruption of the charging in a more prominent manner than when the cause is determined as being the second cause.

11 Claims, 11 Drawing Sheets

(51) Int. Cl.
   *H02J 50/10*        (2016.01)
   *H01M 10/44*        (2006.01)

(56) References Cited

U.S. PATENT DOCUMENTS

| | | | | |
|---|---|---|---|---|
| 9,035,902 | B2* | 5/2015 | Huang | G06F 1/3231 |
| | | | | 345/174 |
| 9,124,105 | B2* | 9/2015 | Gunderman | H02J 50/80 |
| 9,387,768 | B2* | 7/2016 | Lovett | B60L 53/00 |
| 9,653,938 | B2* | 5/2017 | Lundgren | H02J 50/90 |
| 9,959,806 | B1* | 5/2018 | Saraya | G06F 13/26 |
| 9,979,221 | B2* | 5/2018 | Chin | H02J 50/90 |
| 10,097,041 | B2* | 10/2018 | Jung | H02J 50/12 |
| 10,112,494 | B2* | 10/2018 | Eisner | B60L 53/16 |
| 10,320,241 | B2* | 6/2019 | Chen | G01R 31/28 |
| 10,566,826 | B2* | 2/2020 | Mansour | H04B 5/0037 |
| 10,684,665 | B2* | 6/2020 | Badenes | H02J 7/0047 |
| 11,050,307 | B1* | 6/2021 | Qiu | H02J 50/40 |
| 2008/0258679 | A1* | 10/2008 | Manico | H02J 7/0042 |
| | | | | 320/106 |
| 2010/0081473 | A1* | 4/2010 | Chatterjee | H02J 50/10 |
| | | | | 455/575.1 |
| 2012/0262109 | A1* | 10/2012 | Toya | H01M 10/44 |
| | | | | 320/108 |
| 2015/0191122 | A1 | 7/2015 | Roy et al. | |
| 2018/0337557 | A1* | 11/2018 | Chen | H02J 7/025 |
| 2019/0202401 | A1* | 7/2019 | Lee | B60R 25/10 |
| 2020/0014223 | A1* | 1/2020 | Patel | H02J 7/0029 |
| 2020/0076248 | A1* | 3/2020 | Ye | H02J 7/0021 |
| 2021/0228103 | A1* | 7/2021 | Richter | G06K 7/10366 |

* cited by examiner

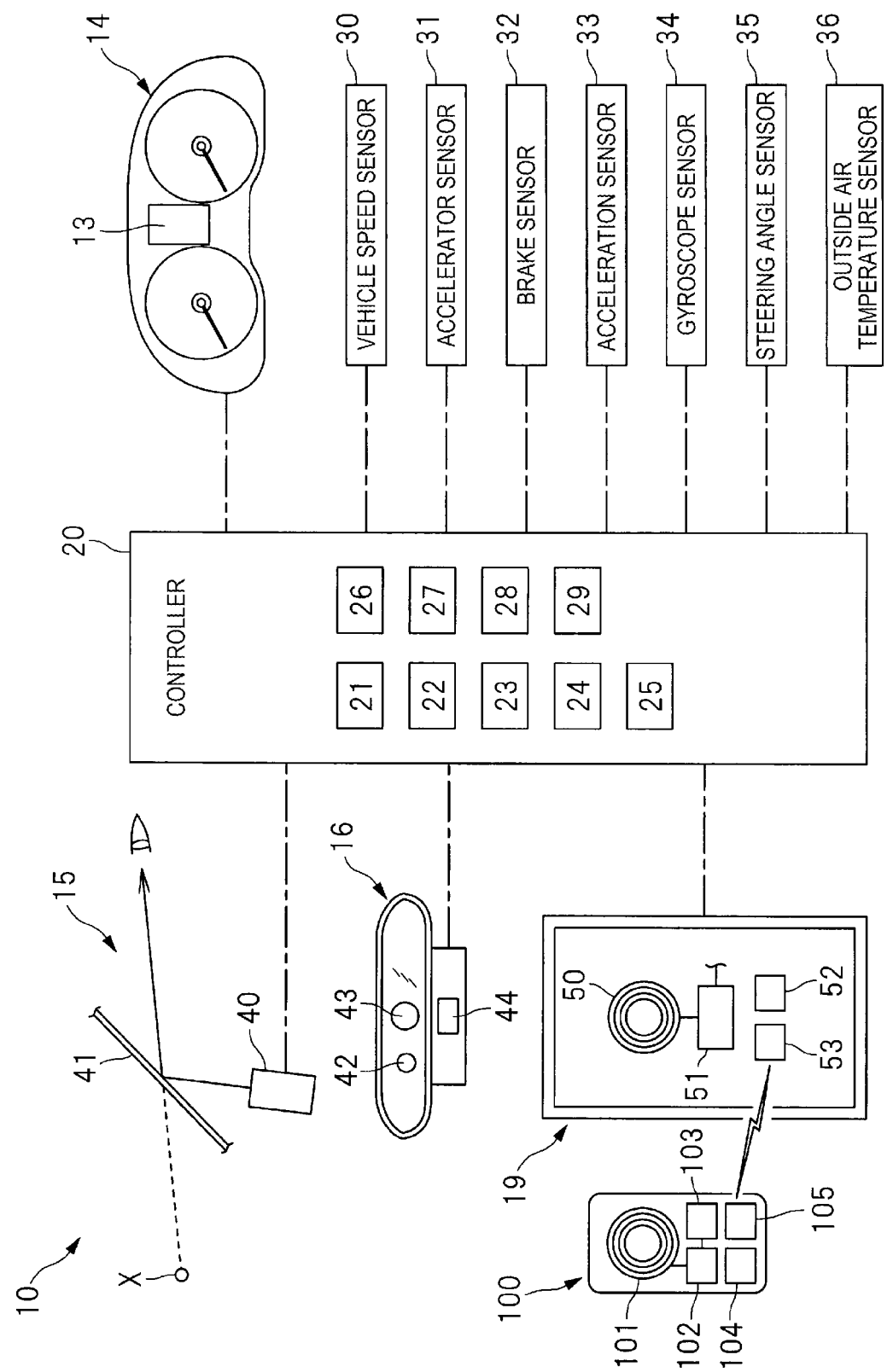

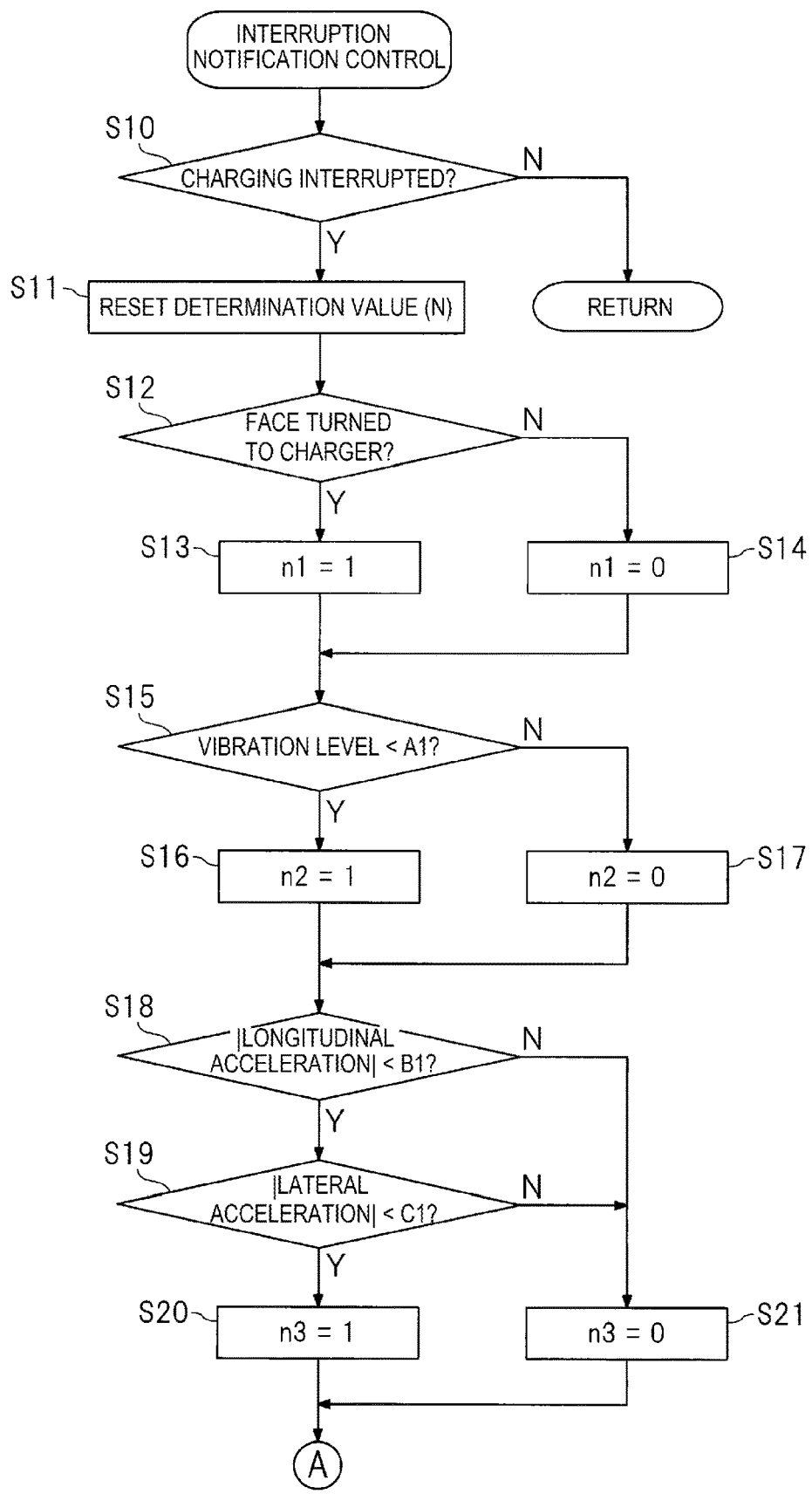

FIG. 6A
TABLE A: FIRST NOTIFICATION MODE

| | | | TRAVELING STATE | | |
|---|---|---|---|---|---|
| | | | 2 (ACCELERATION/DECELERATION TRAVELING) (TURN TRAVELING) | 1 (NORMAL TRAVELING) | 0 (HIGH-SPEED TRAVELING) |
| CHARGING REQUEST LEVEL | HIGH ↑ SOC ↓ LOW | 0 | NOT DISPLAYED | METER | METER |
| | | 1 | METER | METER | HUD |
| | | 2 | HUD | HUD | HUD |

FIG. 6B
TABLE B

| | | | TRAVELING STATE | | |
|---|---|---|---|---|---|
| | | | 2 (ACCELERATION/DECELERATION TRAVELING) (TURN TRAVELING) | 1 (NORMAL TRAVELING) | 0 (HIGH-SPEED TRAVELING) |
| CHARGING REQUEST LEVEL | HIGH ↑ SOC ↓ LOW | 0 | NOT DISPLAYED | NOT DISPLAYED | METER |
| | | 1 | NOT DISPLAYED | METER | HUD |
| | | 2 | METER | HUD | HUD |

FIG. 6C
TABLE C: SECOND NOTIFICATION MODE

| | | | TRAVELING STATE | | |
|---|---|---|---|---|---|
| | | | 2 (ACCELERATION/DECELERATION TRAVELING) (TURN TRAVELING) | 1 (NORMAL TRAVELING) | 0 (HIGH-SPEED TRAVELING) |
| CHARGING REQUEST LEVEL | HIGH ↑ SOC ↓ LOW | 0 | NOT DISPLAYED | NOT DISPLAYED | NOT DISPLAYED |
| | | 1 | NOT DISPLAYED | NOT DISPLAYED | METER |
| | | 2 | NOT DISPLAYED | METER | METER |

FIG. 9A
TABLE A: FIRST NOTIFICATION MODE

| CHARGING REQUEST LEVEL | SOC | | |
|---|---|---|---|
| | HIGH ↑ | 0 | METER |
| | | 1 | METER |
| | ↓ LOW | 2 | HUD |

FIG. 9B
TABLE B

| CHARGING REQUEST LEVEL | SOC | | |
|---|---|---|---|
| | HIGH ↑ | 0 | NOT DISPLAYED |
| | | 1 | METER |
| | ↓ LOW | 2 | HUD |

FIG. 9C
TABLE C: SECOND NOTIFICATION MODE

| CHARGING REQUEST LEVEL | SOC | | |
|---|---|---|---|
| | HIGH ↑ | 0 | NOT DISPLAYED |
| | | 1 | NOT DISPLAYED |
| | ↓ LOW | 2 | METER |

FIG. 10A
TABLE A: FIRST NOTIFICATION MODE

| TRAVELING STATE ||
|---|---|
| 1 (NORMAL TRAVELING) | 0 (HIGH-SPEED TRAVELING) |
| METER | HUD |

FIG. 10B
TABLE B

| TRAVELING STATE ||
|---|---|
| 1 (NORMAL TRAVELING) | 0 (HIGH-SPEED TRAVELING) |
| METER | HUD |

FIG. 10C
TABLE C: SECOND NOTIFICATION MODE

| TRAVELING STATE ||
|---|---|
| 1 (NORMAL TRAVELING) | 0 (HIGH-SPEED TRAVELING) |
| NOT DISPLAYED | METER |

FIG. 11A
TABLE A: FIRST NOTIFICATION MODE

| TRAVELING STATE | |
|---|---|
| 2 (ACCELERATION/DECELERATION TRAVELING) (TURN TRAVELING) | 1 (NORMAL TRAVELING) |
| METER | HUD |

FIG. 11B
TABLE B

| TRAVELING STATE | |
|---|---|
| 2 (ACCELERATION/DECELERATION TRAVELING) (TURN TRAVELING) | 1 (NORMAL TRAVELING) |
| NOT DISPLAYED | METER |

FIG. 11C
TABLE C: SECOND NOTIFICATION MODE

| TRAVELING STATE | |
|---|---|
| 2 (ACCELERATION/DECELERATION TRAVELING) (TURN TRAVELING) | 1 (NORMAL TRAVELING) |
| NOT DISPLAYED | NOT DISPLAYED |

VEHICLE CONTROL APPARATUS

CROSS-REFERENCE TO RELATED APPLICATIONS

The present application claims priority from Japanese Patent Application No. 2019-166808 filed on Sep. 13, 2019, the entire contents of which are hereby incorporated by reference.

BACKGROUND

The disclosure relates to a vehicle control apparatus provided in a vehicle having a wireless charger for charging a mobile device that is placed on the wireless charger.

In recent years, vehicles having a wireless charger for charging a mobile device, such as a smartphone, have been developed (refer to Japanese Unexamined Patent Applications Publication Nos. 2013-207819, 2015-129753, and 2016-077023).

SUMMARY

An aspect of the disclosure provides a vehicle control apparatus to be provided in a vehicle including a wireless charger that charges a mobile device placed on the wireless charger. The vehicle control apparatus includes an interruption detector, a cause determination unit, and a notification controller. The interruption detector is configured to detect interruption of charging of the mobile device by the wireless charger, based on an operating state of the wireless charger. The cause determination unit is configured to determine whether a cause of the interruption of the charging of the mobile device is a first cause or a second cause. The first cause is that the mobile device is moved by inertia during traveling of the vehicle. The second cause is that the mobile device is moved by a passenger. The notification controller is configured to, when the cause is determined as being the first cause, notify the passenger of information about the interruption of the charging of the mobile device in a more prominent manner than when the cause is determined as being the second cause.

An aspect of the disclosure provides a vehicle control apparatus to be provided in a vehicle including a wireless charger that charges a mobile device placed on the wireless charger. The vehicle control apparatus includes circuitry. The circuitry is configured to detect interruption of charging of the mobile device by the wireless charger, based on an operating state of the wireless charger. The circuitry is configured to determine whether a cause of the interruption of the charging of the mobile device is a first cause or a second cause. The first cause is that the mobile device is moved by inertia during traveling of the vehicle. The second cause is that the mobile device is moved by a passenger. The circuitry is configured to, when the cause is determined as being the first cause, notify the passenger of information about the interruption of the charging of the mobile device in a more prominent manner than when the cause is determined as being the second cause.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 2 illustrates a configuration example of the vehicle control apparatus.

FIG. 4 is a flowchart illustrating an example of an execution procedure of interruption notification control.

FIG. 6A illustrates a table A.

FIG. 6B illustrates a table B.

FIG. 6C illustrates a table C.

FIGS. 9A to 9C illustrate the tables A to C of other embodiment.

FIGS. 10A to 10C illustrate the tables A to C of still other embodiment.

FIGS. 11A to 11C illustrate the tables A to C of yet other embodiment.

DETAILED DESCRIPTION

To charge a mobile device by using a wireless charger, the mobile device is placed at a specific position on the wireless charger in such a manner that a coil of the mobile device overlaps a coil of the wireless charger. At this time, the mobile device may be dislocated on the wireless charger by an inertial force applied thereto, due to, for example, acceleration traveling of a vehicle. This can separate the coils from each other and can cause interruption of charging of the mobile device. In such a case in which charging of the mobile device is interrupted due to acceleration traveling or other cause, the charging interruption may be appropriately notified to a passenger.

It is desirable to enable appropriately notifying a passenger that charging of a mobile device is interrupted.

Figure 1:
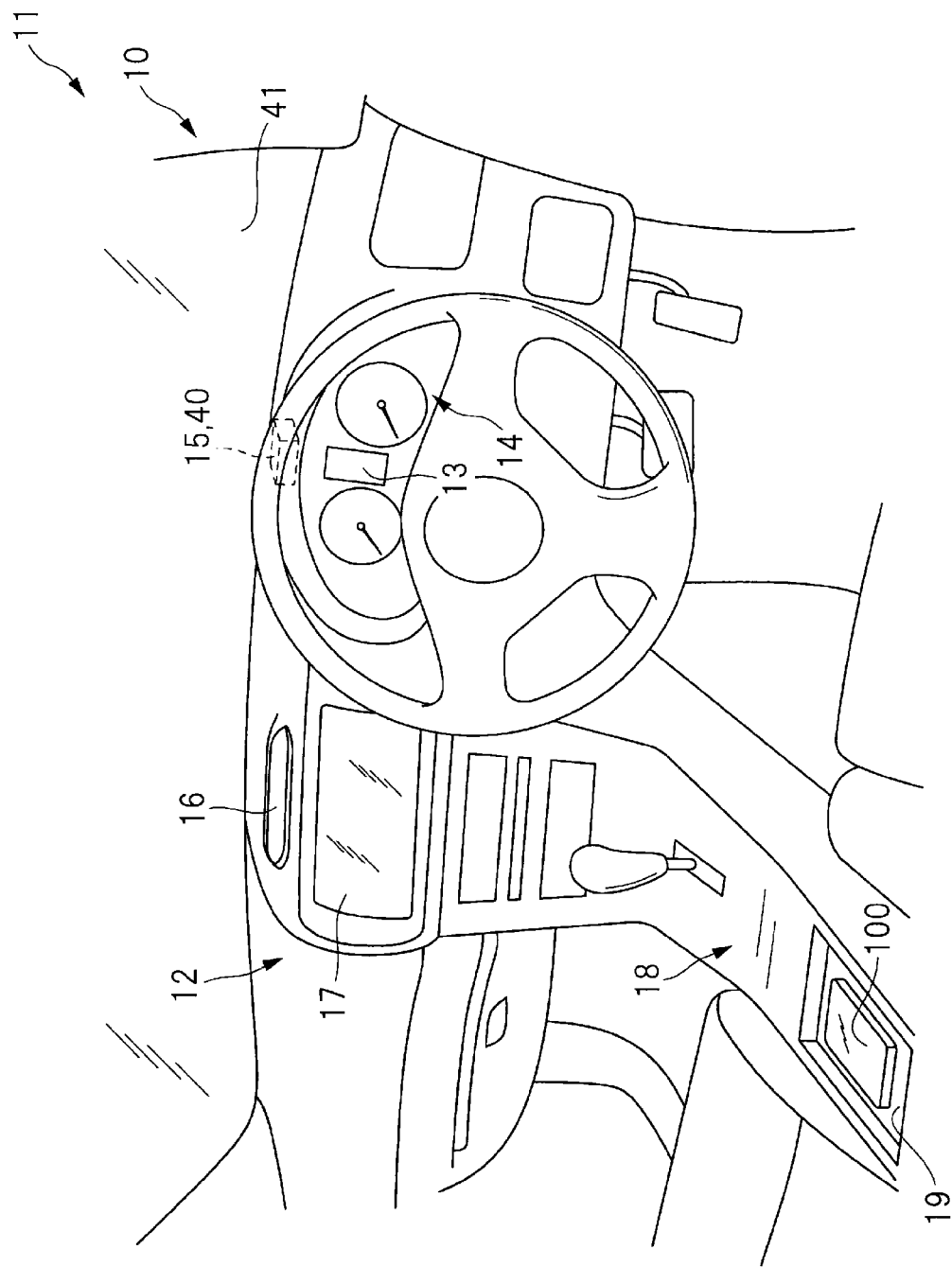
FIG. 1 illustrates a vehicle cabin of a vehicle provided with a vehicle control apparatus according to an embodiment of the disclosure.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Vehicle Cabin Structure FIG. 1 illustrates a vehicle cabin of a vehicle 11 provided with a vehicle control apparatus 10 according to an embodiment of the disclosure. As illustrated in FIG. 1, an instrument panel 12 is furnished on a front side of the vehicle cabin. The instrument panel 12 is provided with a combination meter 14 having a meter display 13. In one embodiment, the meter display 13 may serve as a "sub-display". The instrument panel 12 is also provided with a head-up display 15 for displaying a virtual image in a field of view in front of a driver or a passenger. Moreover, the instrument panel 12 is provided with a monitoring unit 16 and a navigation display 17. The monitoring unit 16 detects, for example, looking-aside of a driver. The navigation display 17 displays location information of the vehicle 11 and other information. A center console 18 is installed between a driver's seat and a passenger seat. The center console 18 is provided with a wireless charger 19 for charging a mobile device 100, such as a smartphone.

Vehicle Control Apparatus

FIG. 2 illustrates a configuration example of the vehicle control apparatus 10. As illustrated in FIG. 2, the vehicle control apparatus 10 is provided with a controller 20 that includes a microcomputer and other components for controlling to mutually cooperatively operate, for example, the wireless charger 19, the head-up display 15, and the meter display 13. The controller 20 serves as a control unit and includes a charger controller 21 for controlling the wireless charger 19, a HUD controller 22 for controlling the head-up display 15, and a meter controller 23 for controlling the meter display 13.

As described later, when charging of the mobile device 100 by the wireless charger 19 is interrupted, the controller 20 displays information about the interruption of the charging of the mobile device 100 (that is, the charging interruption information) on, for example, the head-up display 15, or the meter display 13. For this purpose, the controller 20 is provided with an interruption detector 24, a cause determination unit 25, and a notification controller 26. The interruption detector 24 detects interruption of charging of the mobile device 100. The cause determination unit 25 determines the cause of interruption of charging of the mobile device 100. The notification controller 26 notifies a driver of the information about the interruption of the charging (which may be referred to as "charging interruption information"). The controller 20 is also provided with an image determination unit 27, a state of charge (SOC) determination unit 28, a traveling determination unit 29, and other components. The image determination unit 27 determines whether the face of a driver is turned to the wireless charger 19. The SOC determination unit 28 determines the SOC of a battery 103 of the mobile device 100. The traveling determination unit 29 determines the travelling state of the vehicle 11, for example, acceleration traveling or turn traveling. An example of the charging interruption information to be displayed on the display includes "Charging of the mobile device is interrupted".

Sensors are coupled to the controller 20 and include a vehicle speed sensor 30 for measuring vehicle speed, an accelerator sensor 31 for measuring an operated state of an accelerator pedal, and a brake sensor 32 for measuring an operated state of a brake pedal. The sensors that are coupled to the controller 20 also include an acceleration sensor 33 for measuring acceleration applied to the vehicle 11, a gyroscope sensor 34 for measuring angular acceleration applied to the vehicle 11, a steering angle sensor 35 for measuring a steering angle of a steering wheel, and an outside air temperature sensor 36 for measuring temperature of an outside air. The acceleration sensor 33 measures longitudinal acceleration applied in a longitudinal direction of the vehicle 11, lateral acceleration applied to a vehicle width direction of the vehicle 11, and vertical acceleration applied to a vertical direction of the vehicle 11, as the acceleration applied to the vehicle 11.

The vehicle control apparatus 10 includes the head-up display 15 for displaying a virtual image X in a field of view in front of a driver. The head-up display 15 is provided with an irradiation unit 40 that includes a light source, a liquid crystal display, and a magnifying glass, which are not illustrated in the drawing. The liquid crystal display in the irradiation unit 40 displays information, for example, a vehicle speed. Such information is projected from the irradiation unit 40 to a reflection film inside a windshield 41. This enables the driver to recognize information, such as a vehicle speed, ahead of the windshield 41 as a virtual image X. Thus, the head-up display 15 displays information at a position that is easy to view, compared with cases of the meter display 13 and the navigation display 17.

The vehicle control apparatus 10 also includes the monitoring unit 16 that measures, for example, looking-aside and dozing of a driver. The monitoring unit 16 is provided with a light emitting diode 42, an infrared camera 43, an image analyzer 44, and other components. In one embodiment, the infrared camera 43 may serve as a "camera". To detect, for example, looking-aside of a driver by the monitoring unit 16, infrared light is emitted from the light emitting diode 42 to the face of the driver, and an image of the face of the driver is captured by the infrared camera 43. Thereafter, image information is sent from an image sensor of the infrared camera 43 to the image analyzer 44 for analyzing the direction of the face. The image analyzer 44 extracts parts such as an eye and a mouth from the image information and determines the direction of the face based on positional relationships of these parts, thereby detecting, for example, looking-aside of the driver.

Wireless Charger

As illustrated in FIG. 2, the vehicle control apparatus 10 includes the wireless charger 19 for charging the mobile device 100. The wireless charger 19, which is also called a "contactless charger", is provided with a power transmission coil 50, a drive circuit 51, a power transmission controller 52, a wireless communication unit 53, and other components. The drive circuit 51 of the wireless charger 19 is coupled to a vehicle power source, such as a battery, which is not illustrated in the drawing. On the other hand, the mobile device 100, which is to be charged by the wireless charger 19, is provided with a power reception coil 101, a rectifier circuit 102, the battery 103, a device controller 104, a wireless communication unit 105, and other components.

For example, an electromagnetic induction power transmission method can be employed as a power transmission method of the wireless charger 19. To charge the mobile device 100 by using the wireless charger 19, the mobile device 100 is placed on the wireless charger 19 in such a manner that the coils 50 and 101 thereof overlap. Thereafter, the wireless charger 19 supplies AC power from the drive circuit 51, which is controlled by the power transmission controller 52, to the power transmission coil 50, to make the power transmission coil 50 generate a cyclically varying magnetic flux. Thus, making the power transmission coil 50 generate the magnetic flux causes electromagnetic induction. The electromagnetic induction generates an electromotive force in the power reception coil 101 of the mobile device 100, which faces the power transmission coil 50. The electromotive force that is generated in the power reception coil 101 is converted into DC power via the rectifier circuit 102, and the DC power is supplied from the rectifier circuit 102 to the battery 103.

Figure 3A:
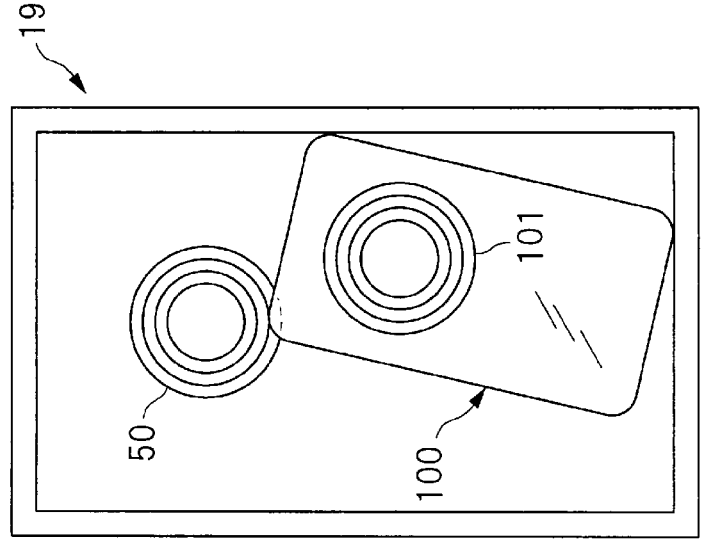
FIG. 3A illustrates a state in which wireless charging is executed.
Figure 3B:
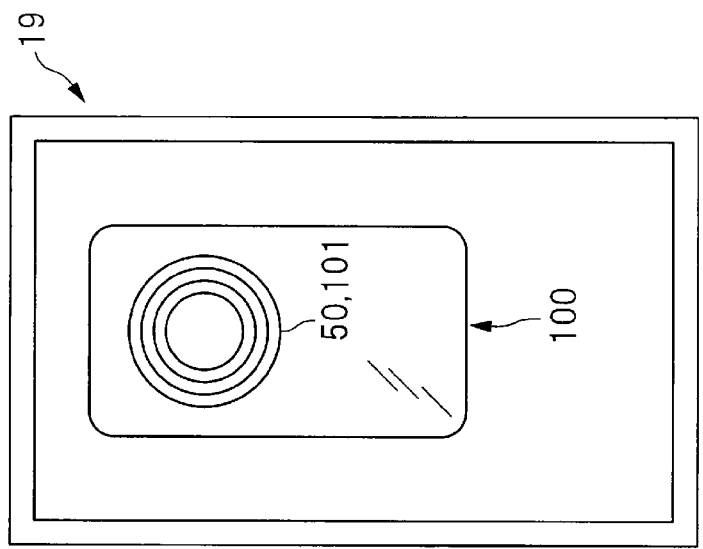
FIG. 3B illustrates a state in which the wireless charging is interrupted.

FIG. 3A illustrates a state in which wireless charging is executed. FIG. 3B illustrates a state in which the wireless charging is interrupted. As illustrated in FIG. 3A, in order to charge the mobile device 100 by using the wireless charger 19, the power reception coil 101 is overlapped on the power transmission coil 50. As a result, while the power transmission coil 50 and the power reception coil 101 mutually face each other, the power transmission coil 50 supplies power to the power reception coil 101, whereby the wireless charger 19 charges the battery 103 of the mobile device 100. On the other hand, as illustrated in FIG. 3B, when the mobile device 100 is dislocated from the predetermined position on the wireless charger 19 and the power reception coil 101 becomes not overlapped on the power transmission coil 50, the power supply from the power transmission coil 50 to the power reception coil 101 is shut off. Thus, charging of the mobile device 100 by the wireless charger 19 is interrupted. For this reason, in such as acceleration traveling or turn traveling, the mobile device 100 may be moved by inertia, and charging of the mobile device 100 may be interrupted without intention of a driver.

The mobile device 100 periodically sends charging control information to the wireless charger 19 while being charged by the wireless charger 19. That is, the device controller 104 of the mobile device 100 sets, for example, a power transmission request or required power, to the wireless charger 19 as the charging control information. Then, the wireless communication unit 105 of the mobile device 100 periodically sends the charging control information, such as a power transmission request or required power, to the wireless communication unit 53 of the wireless charger 19. The device controller 104 of the mobile device 100 calculates an SOC that shows a charged state of the battery 103, and the device controller 104 periodically sends the calculated SOC to the wireless charger 19. The SOC of the battery 103 is a ratio showing a residual amount of electricity of the battery 103, that is, a ratio of a charged electricity amount to a fully charged capacity of the battery 103. For example, the calculated SOC is 100% when the battery 103 is charged to the upper limit capacity, whereas the calculated SOC is 0% when the battery 103 is discharged to the lower limit capacity.

The state of charging of the mobile device 100 by the wireless charger 19 is controlled by the charger controller 21 of the controller 20. That is, the charger controller 21 of the controller 20 outputs a control signal to the power transmission controller 52 of the wireless charger 19 based on the charging control information sent from the mobile device 100, such as a power transmission request or requested power. The controller 20 is also provided with the interruption detector 24 for detecting interruption of charging of the mobile device 100 based on an operating state of the wireless charger 19. The interruption detector 24 detects interruption of charging of the mobile device 100 based on a power transmission state from the power transmission coil 50 to the power reception coil 101. In other words, the interruption detector 24 detects interruption of charging of the mobile device 100 by knowing a great reduction in consumption of power in the power transmission coil 50 based on variation in electric current or in voltage in the power transmission coil 50.

Interruption Notification Control

Figure 5:
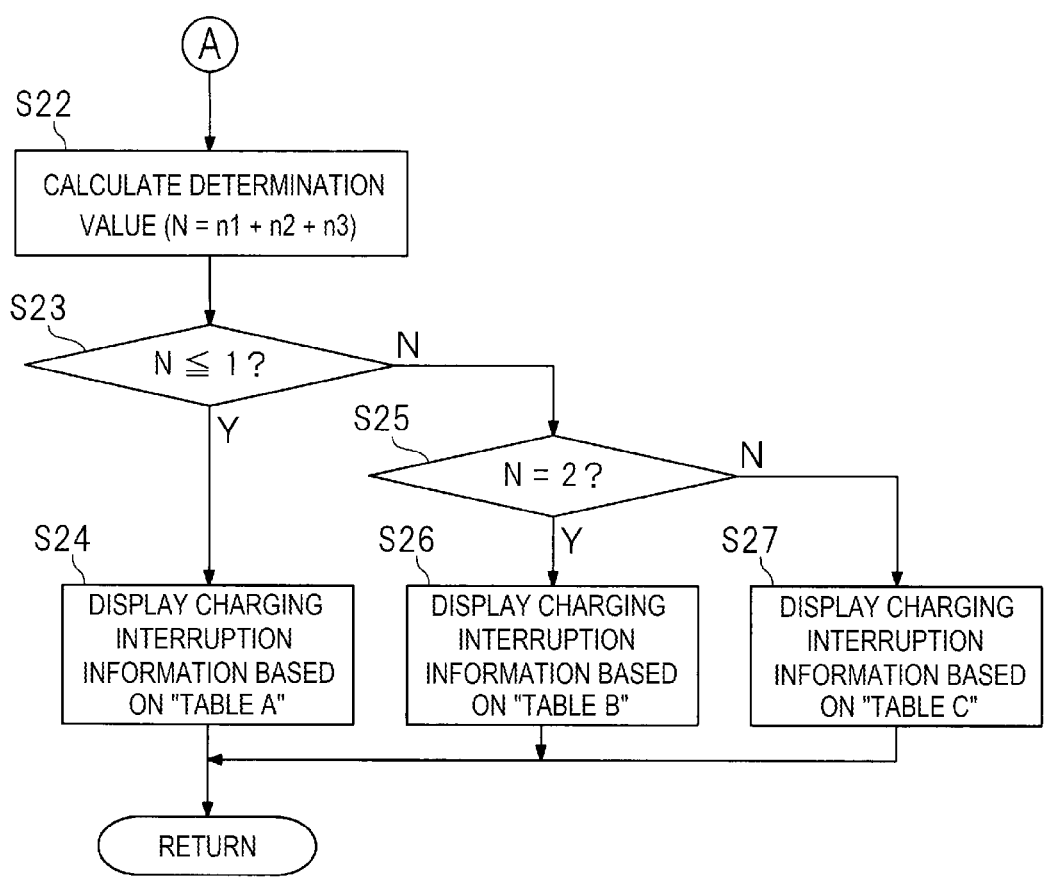
FIG. 5 is a flowchart illustrating an example of an execution procedure of the interruption notification control.

Next, the interruption notification control that is executed by the controller 20 will be described. The interruption notification control is performed to display the charging interruption information on, for example, the head-up display 15, when charging of the mobile device 100 by the wireless charger 19 is interrupted. The interruption notification control is executed by, for example, the interruption detector 24, the cause determination unit 25, the notification controller 26, the image determination unit 27, the SOC determination unit 28, and the traveling determination unit 29 of the controller 20. FIGS. 4 and 5 are flowcharts illustrating examples of execution procedures of the interruption notification control. The flowcharts illustrated in FIGS. 4 and 5 are coupled to each other at parts indicated by reference signs A.

As illustrated in FIG. 4, in step S10, whether charging of the mobile device 100 by the wireless charger 19 is interrupted is determined. When it is determined that charging of the mobile device 100 is interrupted in step S10, the procedure advances to step S11, and a determination value N is reset. The determination value N is used in selecting table data, which will be described later. In the subsequent step S12, whether the face of the driver is turned to the wireless charger 19 is determined based on result of image analysis sent from the monitoring unit 16. When it is determined that the driver faces the wireless charger 19 in step S12, it is highly probable that the driver has touched the mobile device 100. In this case, the procedure advances to step S13, and an addition value n1 is set at "1". On the other hand, when it is determined that the driver does not face the wireless charger 19 in step S12, it is less probable that the driver has touched the mobile device 100. In this case, the procedure advances to step S14, and the addition value n1 is set at "0".

Next, in step S15, whether a vibration level of the vehicle 11 is lower than a predetermined threshold A1 is determined based on the vertical acceleration sent from the acceleration sensor 33. In step S15, when the vibration level of the vehicle 11 is determined as being lower than the threshold A1, vehicle vibration during traveling is determined as being small. In this case, the procedure advances to step S16, and an addition value n2 is set at "1". On the other hand, in step S15, when the vibration level of the vehicle 11 is determined as being the threshold A1 or greater, vehicle vibration during traveling is determined as being great. In this case, the procedure advances to step S17, and the addition value n2 is set at "0". The vibration level is an indicator showing a vibrating state of the traveling vehicle. The vibration level is greater as the vertical acceleration increases, whereas the vibration level is smaller as the vertical acceleration decreases.

Then, in step S18, whether the longitudinal acceleration of the vehicle 11 is lower than a predetermined threshold B1 is determined based on the longitudinal acceleration sent from the acceleration sensor 33. When the longitudinal acceleration is determined as being lower than the threshold B1 in step S18, the procedure advances to step S19, and whether the lateral acceleration of the vehicle 11 is lower than a predetermined threshold C1 is determined based on the lateral acceleration sent from the acceleration sensor 33. When the lateral acceleration is determined as being lower than the threshold C1 in step S19, the procedure advances to step S20, and an addition value n3 is set at "1". That is, when it is determined that the longitudinal acceleration is lower than the threshold B1 and the lateral acceleration is lower than the threshold C1, that is, it is determined that acceleration/deceleration traveling and turn traveling are not performed. In this case, the procedure advances to step S20, and the addition value n3 is set at "1". On the other hand, when the longitudinal acceleration is determined as being the threshold B1 or greater in step S18, or when the lateral acceleration is determined as being the threshold C1 or greater in step S19, it is determined that acceleration/deceleration traveling or turn traveling is being performed. In these cases, the procedure advances to step S21, and the addition value n3 is set at "0".

As illustrated in FIG. 5, in step S22, the determination value N is calculated by adding the addition values n1 to n3 (N=n1+n2+n3). That is, each of the addition values n1 to n3 is set at "0" or "1", and therefore, the determination value N is set at either one of "0", "1", "2", and "3". As described above, when the addition values n1 to n3 are set at "0", it is less probable that the driver has touched the mobile device 100, the vehicle vibration during traveling is great, or acceleration/deceleration traveling or turn traveling is being performed. That is, charging of the mobile device 100 is interrupted because the mobile device 100 is dislocated by vibration or acceleration during traveling of the vehicle, in other words, the mobile device 100 is moved by inertia during traveling of the vehicle. This first cause makes the calculated determination value N small and closer to "0". On the other hand, when the addition values n1 to n3 are set at "1", it is highly probable that the driver has touched the mobile device 100, the vehicle vibration during traveling is small, or acceleration/deceleration traveling or turn traveling is not performed. That is, charging of the mobile device 100 is interrupted because the mobile device 100 is dislocated by touching of the driver, in other words, the mobile device 100 is moved by the driver. This second cause makes the calculated determination value N large and closer to "3".

Next, the process proceeds to step S23, and whether the determination value N is "1" or less is determined. When the determination value N is determined as being "0" or "1" in step S23, charging of the mobile device 100 is interrupted due to the first cause: the mobile device 100 is moved by inertia during traveling of the vehicle. In this case, the procedure advances to step S24, and the charging interruption information showing interruption of charging of the mobile terminal is displayed based on table data A. The table data A will be described later as a table A. In short, the controller 20 displays the charging interruption information in accordance with a notification mode using the table A when determining that charging of the mobile device 100 is interrupted by the first cause due to the traveling state. The notification mode using the table A is a first notification mode.

When the determination value N is determined as being "2" or greater in step S23, the procedure advances to step S25, and whether the determination value N is "2" is determined. When the determination value N is determined as being "2" in step S25, the procedure advances to step S26, and the charging interruption information showing interruption of charging of the mobile terminal is displayed based on table data B. The table data B will be described later as a table B. In the situation in which the charging interruption information is displayed by using the table B, the cause of interruption of charging is not determined as being the first cause or the second cause, which are described above. In short, the controller 20 displays the charging interruption information in accordance with a notification mode using the table B when the cause of interruption of charging of the mobile device 100 is not determined as being the first cause or the second cause.

Moreover, when the determination value N is not determined as being "2" in step S25, that is, the determination value N is determined as being "3", the procedure advances to step S27. When the determination value N is "3", charging of the mobile device 100 is interrupted due to movement of the mobile device 100 by a driver, which is the second cause. In such a case in which the cause of interruption of charging of the mobile device 100 is determined as being the second cause, the procedure advances to step S27. Then, the charging interruption information showing interruption of charging of the mobile terminal is displayed based on table data C. The table data C will be described later as a table C. In short, the controller 20 displays the charging interruption information in accordance with a notification mode using the table C when the cause of interruption of charging of the mobile device 100 is the second cause due to a driver. The notification mode using the table C is a second notification mode.

Table Data

FIG. 6A illustrates the table A, FIG. 6B illustrates the table B, and FIG. 6C illustrates the table C. As described above, the table A is table data that is used when the cause of interruption of charging is the first cause due to the traveling state, that is, when charging is interrupted without intention of a driver. The table C is table data that is used when the cause of interruption of charging is the second cause due to a driver, that is, when charging is interrupted intentionally by a driver. The term "HUD" illustrated in FIGS. 6A and 6B means the "head-up display". The term "METER" illustrated in FIGS. 6A to 6C means the "meter display".

As illustrated in FIGS. 6A to 6C, a method for displaying the charging interruption information is specified in each of the tables A to C based on two parameters: a charging request level and a traveling state, which will be described later. That is, either one of displaying methods of "HUD", "METER", and "NOT DISPLAYED" is selected in accordance with the charging request level and the traveling state, which will be described later. In one example, in which the table A is selected, when the charging request level is "2" and the traveling state is "2", "HUD" is selected, as illustrated in FIG. 6A. Thus, the charging interruption information is displayed on the head-up display 15. Details of the charging request level and the traveling state will be described later. In another example, in which the table A is selected, when the charging request level is "1" and the traveling state is "2", "METER" is selected. Thus, the charging interruption information is displayed on the meter display 13. In yet another example, in which the table A is selected, when the charging request level is "0" and the traveling state is "2", "NOT DISPLAYED" is selected. Thus, the charging interruption information is not displayed on both of the displays.

To display the charging interruption information on the head-up display 15, a signal is output from the notification controller 26 of the controller 20 to the HUD controller 22, whereby the HUD controller 22 controls the head-up display 15. To display the charging interruption information on the meter display 13, a signal is output from the notification controller 26 of the controller 20 to the meter controller 23, whereby the meter controller 23 controls the meter display 13.

Determination of Charging Request Level

Figure 7:
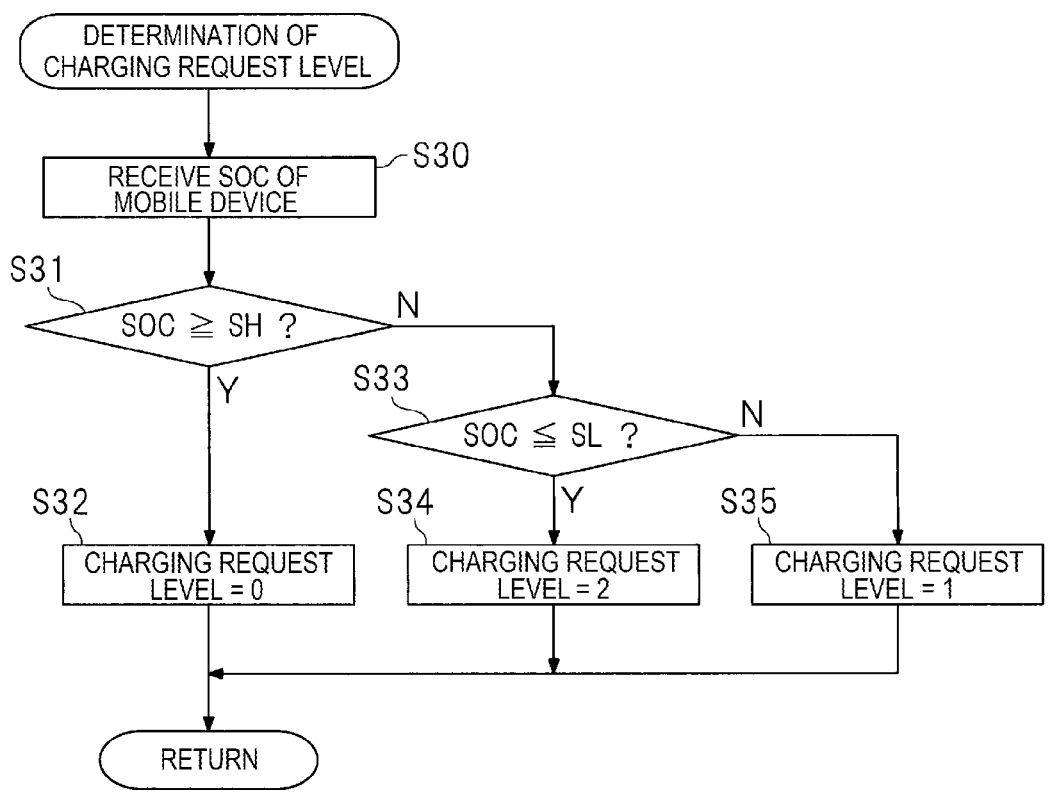
FIG. 7 is a flowchart illustrating an example of a procedure for determining a charging request level.

A procedure for determining the charging request level as one of the parameters will be described. The charging request level is determined by the SOC determination unit 28 of the controller 20. FIG. 7 is a flowchart illustrating an example of a procedure for determining a charging request level.

As illustrated in FIG. 7, in step S30, the SOC of the battery 103 of the mobile device 100 is read by the controller 20. In step S31, whether the SOC of the battery 103 is a predetermined threshold SH or greater is determined. In one example, the threshold SH is 80%. When the SOC is determined as being the threshold SH or greater in step S31, the procedure advances to step S32, and the charging request level is set at "0". On the other hand, when the SOC is determined as being lower than the threshold SH in step S31, the procedure advances to step S33, and whether the SOC of the battery 103 is a predetermined threshold SL or lower is determined. In one example, the threshold SL is 20%. When the SOC is determined as being the threshold SL or lower in step S33, the procedure advances to step S34, and the charging request level is set at "2". On the other hand, when the SOC is determined as being greater than the threshold SL in step S33, the SOC is determined as being greater than the threshold SL and being lower than the threshold SH. In this case, the procedure advances to step S35, and the charging request level is set at "1".

As described above, in the situation in which the charging request level is set at "0", the SOC of the battery 103 is high, such as being the threshold SH or greater, and therefore, charging of the mobile device 100 is not urgent. In the situation in which the charging request level is set at "1", the SOC of the battery 103 is greater than the threshold SL and is lower than the threshold SH, and therefore, charging of the mobile device 100 is recommended but is not urgent. In the situation in which the charging request level is set at "2", the SOC of the battery 103 is low, such as being the threshold SL or lower, and therefore, early charging of the mobile device 100 is recommended.

Determination of Traveling State

Figure 8:
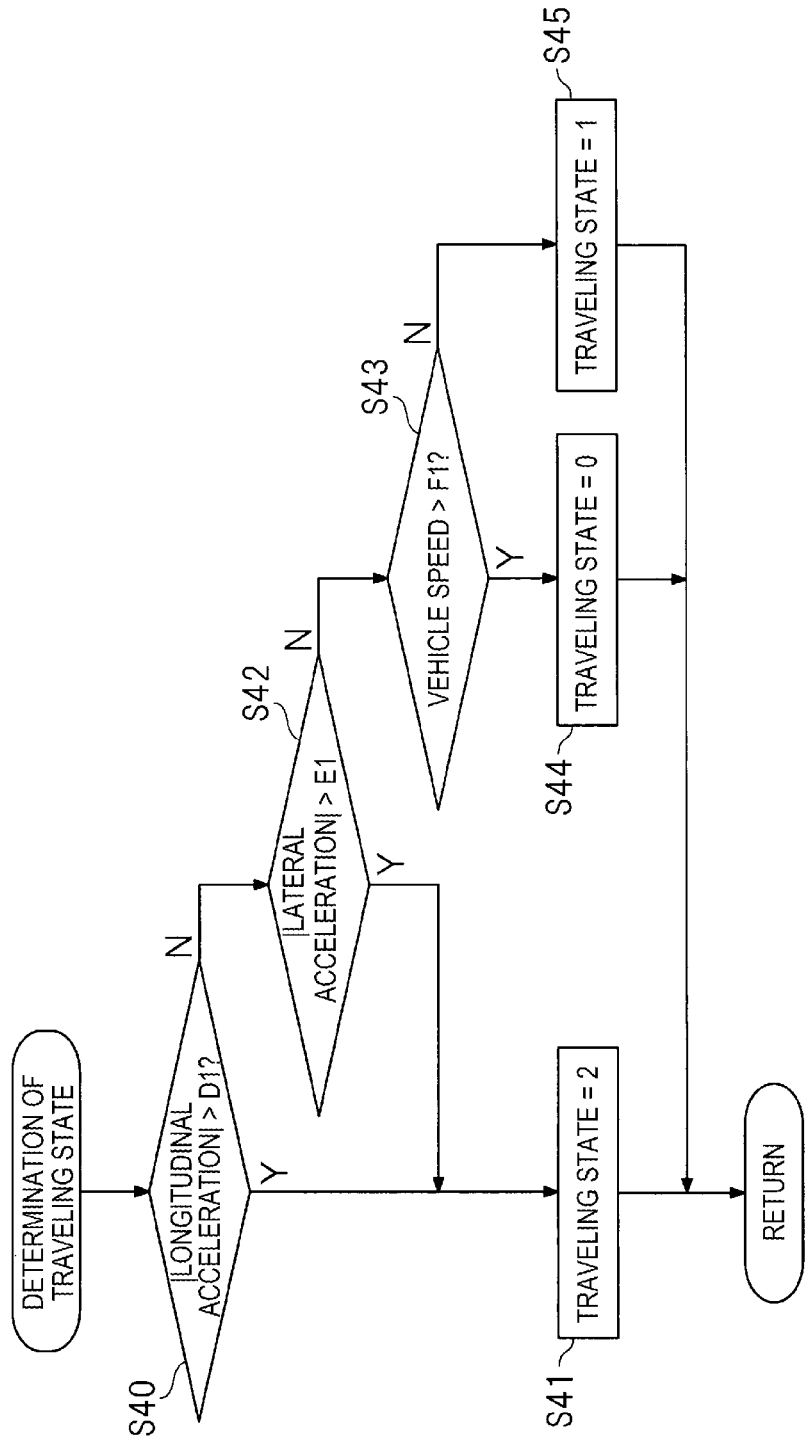
FIG. 8 is a flowchart illustrating an example of a procedure for determining a traveling state.

A procedure for determining the traveling state as one of the parameters will be described. The traveling state is determined by the traveling determination unit 29 of the controller 20. FIG. 8 is a flowchart illustrating an example of a procedure for determining a traveling state.

As illustrated in FIG. 8, in step S40, whether the longitudinal acceleration of the vehicle 11 is greater than a predetermined threshold D1 is determined based on the longitudinal acceleration sent from the acceleration sensor 33. When the longitudinal acceleration is determined as being greater than the threshold D1 in step S40, it is determined that the vehicle 11 is being accelerated or decelerated. In this case, the procedure advances to step S41, and the traveling state is set at "2". On the other hand, when the longitudinal acceleration is determined as being the threshold D1 or lower in step S40, the procedure advances to step S42. Then, whether the lateral acceleration of the vehicle 11 is greater than a predetermined threshold E1 is determined based on the lateral acceleration sent from the acceleration sensor 33. When the lateral acceleration is determined as being greater than the threshold E1 in step S42, it is determined that the vehicle 11 is turning. In this case, the procedure advances to step S41, and the traveling state is set at "2".

On the other hand, when the lateral acceleration is determined as being the threshold E1 or lower in step S42, the procedure advances to step S43, and whether the vehicle speed is greater than a predetermined threshold F1 is determined. When the vehicle speed is determined as being greater than the threshold F1 in step S43, it is determined that the vehicle 11 is traveling at high speed. In this case, the procedure advances to step S44, and the traveling state is set at "0". On the other hand, when the vehicle speed is determined as being the threshold F1 or lower in step S43, it is determined that the vehicle 11 is not traveling at high speed or is not being accelerated or decelerated but is traveling normally. In this case, the procedure advances to step S45, and the traveling state is set at "1".

As described above, in the situation in which the traveling state is set at "2", acceleration/deceleration traveling or turn traveling is being performed, and therefore, it is expected that the driver wants to concentrate on driving operation. In the situation in which the traveling state is set at "1", traveling is being performed at high speed, and therefore, it is expected that the field of view of the driver is narrowed. Moreover, in the situation in which the traveling state is set at "0", acceleration/deceleration traveling, turn traveling, or high-speed traveling is not being performed, and therefore, the driving situation is normal for the driver.

Examples of Displaying Charging Interruption Information

Table A: First Notification Mode

Examples of displaying the charging interruption information by using the table A will be described. As described above, when the cause of interruption of charging is the first cause due to the traveling state, that is, when charging is interrupted without intention of a driver, the charging interruption information is displayed preferentially on the head-up display 15. For this purpose, the charging interruption information is displayed in accordance with the first notification mode that uses the table A. The first notification mode that uses the table A allows use of the head-up display 15.

As illustrated in FIG. 6A, when the charging request level is set at "2" and early charging of the mobile device 100 is recommended, the charging interruption information is displayed on the head-up display 15 regardless of the traveling state. That is, the charging interruption information is displayed on the head-up display 15 in all of the following cases: the traveling state is "2", such as being in the acceleration traveling state, the traveling state is "1" and is in the normal traveling state, and the traveling state is "0" and is in the high-speed traveling state.

In the situation in which the charging request level is set at "1" and charging of the mobile device 100 is recommended but is not urgent, the method of displaying the charging interruption information is changed in accordance with the traveling state. That is, the charging interruption information is displayed on the meter display 13 in the following cases: the traveling state is "2", such as being in the acceleration traveling state, and the traveling state is "1" and is in the normal traveling state. In this situation, when the traveling state is "0" and is in the high-speed traveling state, the charging interruption information is displayed on the head-up display 15.

In the situation in which the charging request level is set at "0" and charging of the mobile device 100 is not urgent, the method of displaying the charging interruption information is changed in accordance with the traveling state. That is, when the traveling state is "2", such as being in the acceleration traveling state, the charging interruption information is not displayed on both displays. On the other hand, the charging interruption information is displayed on the meter display 13 in the following cases: the traveling state is "1" and is in the normal traveling state, and the traveling state is "0" and is in the high-speed traveling state.

Table B

Examples of displaying the charging interruption information by using the table B will be described. As described above, the charging interruption information is displayed in accordance with the notification mode using the table B when the cause of interruption of charging is not determined as being the first cause or the second cause.

As illustrated in FIG. 6B, in the situation in which the charging request level is set at "2" and early charging of the mobile device 100 is recommended, the method of displaying the charging interruption information is changed in accordance with the traveling state. That is, when the traveling state is "2", such as being in the acceleration traveling state, the charging interruption information is displayed on the meter display 13. On the other hand, the charging interruption information is displayed on the head-up display 15 in the following cases: the traveling state is "1" and is in the normal traveling state, and the traveling state is "0" and is in the high-speed traveling state.

In the situation in which the charging request level is set at "1" and charging of the mobile device 100 is recommended but is not urgent, the method of displaying the charging interruption information is changed in accordance with the traveling state. That is, when the traveling state is "2", such as being in the acceleration traveling state, the charging interruption information is not displayed on both displays. On the other hand, the charging interruption information is displayed on the meter display 13 when the traveling state is "1" and is in the normal traveling state. Moreover, the charging interruption information is displayed on the head-up display 15 when the traveling state is "0" and is in the high-speed traveling state.

In the situation in which the charging request level is set at "0" and charging of the mobile device 100 is not urgent, the method of displaying the charging interruption information is changed in accordance with the traveling state. That is, the charging interruption information is not displayed on both displays in the following cases: the traveling state is "2", such as being in the acceleration traveling state, and the traveling state is "1" and is in the normal traveling state. In this situation, when the traveling state is "0" and is in the high-speed traveling state, the charging interruption information is displayed on the meter display 13.

Table C: Second Notification Mode

Examples of displaying the charging interruption information by using the table C will be described. As described above, when the cause of interruption of charging is the second cause due to a driver, that is, charging of the mobile device 100 is intentionally interrupted by the driver, displaying the charging interruption information is limited in order not to disturb the driver. Thus, the charging interruption information is displayed in accordance with the second notification mode that uses the table C. The second notification mode that uses the table C does not allow use of the head-up display 15.

As illustrated in FIG. 6C, in the situation in which the charging request level is set at "2" and early charging of the mobile device 100 is recommended, the method of displaying the charging interruption information is changed in accordance with the traveling state. That is, when the traveling state is "2", such as being in the acceleration traveling state, the charging interruption information is not displayed. On the other hand, the charging interruption information is displayed on the meter display 13 in the following cases: the traveling state is "1" and is in the normal traveling state, and the traveling state is "0" and is in the high-speed traveling state.

In the situation in which the charging request level is set at "1" and charging of the mobile device 100 is recommended but is not urgent, the method of displaying the charging interruption information is changed in accordance with the traveling state. That is, the charging interruption information is not displayed on both displays in the following cases: the traveling state is "2", such as being in the acceleration traveling state, and the traveling state is "1" and is in the normal traveling state. In this situation, when the traveling state is "0" and is in the high-speed traveling state, the charging interruption information is displayed on the meter display 13.

In the situation in which the charging request level is set at "0" and charging of the mobile device 100 is not urgent, the charging interruption information is not displayed regardless of the traveling state. That is, the charging interruption information is not displayed on both displays in all of the following cases: the traveling state is "2", such as being in the acceleration traveling state, the traveling state is "1" and is in the normal traveling state, and the traveling state is "0" and is in the high-speed traveling state.

CONCLUSION

As described above, when the cause of interruption of charging is the first cause due to the traveling state, that is, when charging is interrupted without intention of a driver, the charging interruption information is notified in accordance with the first notification mode that uses the head-up display 15. On the other hand, when the cause of interruption of charging is the second cause due to a driver, that is, charging of the mobile device 100 is intentionally interrupted by the driver, the charging interruption information is notified in accordance with the second notification mode that does not use the head-up display 15. Namely, when the cause of interruption of charging is determined as being the first cause, the charging interruption information is notified to the driver in a more prominent manner than when the cause of interruption of charging is determined as being the second cause. Thus, when charging is interrupted without intention of a driver, the charging interruption information is notified in a prominent manner, whereby it is possible to encourage the driver to move the mobile device 100 and to quickly resume charging of the mobile device 100. In contrast, when charging of the mobile device 100 is intentionally interrupted by the driver, the charging interruption information is notified in an unnoticeable manner in order not to disturb the driver.

In the above description, as illustrated in the flowcharts in FIGS. 4 and 5, the cause of interruption of charging is determined as being the first cause when the determination value N is "0" or "1", and the cause of interruption of charging is determined as being the second cause when the determination value N is "3". However, the determination may be performed in other manner. In one example, the cause of interruption of charging may be determined as being the first cause when the determination value N is "3". In another example, the cause of interruption of charging is determined as being the second cause when the determination value N is other than "0". In the above description, the cause of interruption of charging is determined based on the direction of the face of a driver, the vibration level of the vehicle 11, the longitudinal acceleration applied to the vehicle 11, and the lateral acceleration applied to the vehicle 11. However, the determination may be performed based on other factors. In one example, the cause of interruption of charging may be determined as being the first cause when a driver does not face the wireless charger 19. In another example, the cause of interruption of charging may be determined as being the first cause when the longitudinal acceleration that is applied to the vehicle 11 is greater than a threshold. In yet another example, the cause of interruption of charging may be determined as being the first cause when the lateral acceleration that is applied to the vehicle 11 is greater than a threshold. In still another example, the cause of interruption of charging may be determined as being the first cause when the vertical acceleration that is applied to the vehicle 11 is greater than a threshold.

As illustrated in the table A in FIG. 6A, in the first notification mode, which is executed when charging is interrupted without intention of a driver, the charging interruption information is displayed on the head-up display 15 when the SOC of the battery 103 is lower than a threshold, whereas the charging interruption information is displayed on the meter display 13 when the SOC of the battery 103 is greater than a threshold. That is, the charging interruption information is displayed on the head-up display 15 in a prominent manner when the SOC is low and charging of the mobile device 100 is recommended. On the other hand, the charging interruption information is displayed on the meter display 13 in an unnoticeable manner when the SOC is high and charging of the mobile device 100 is not urgent. Thus, the head-up display 15 and the meter display 13 are used properly in accordance with the SOC of the battery 103, whereby the charging interruption information is appropriately notified to the driver.

As illustrated in the table A in FIG. 6A, in the first notification mode, which is executed when charging is interrupted without intention of a driver, the charging interruption information is displayed on the head-up display 15 when the vehicle speed is greater than a threshold. That is, in the example illustrated in FIG. 6A, the charging interruption information is displayed on the head-up display 15 when the charging request level is "1" and the vehicle speed is greater than a threshold. Thus, the charging interruption information is displayed on the head-up display 15 in order to enable the driver to easily view it, because the field of view of the driver is narrowed in high-speed traveling. As a result, the charging interruption information is appropriately notified to the driver even in high-speed traveling. The displaying method is not limited to the example illustrated in FIG. 6A. The charging interruption information may be displayed on the head-up display 15 when the vehicle speed is greater than a threshold and the charging request level is "0" or "2".

As illustrated in the table A in FIG. 6A, in the first notification mode, which is executed when charging is interrupted without intention of a driver, the charging interruption information is not displayed on the head-up display 15 when the longitudinal acceleration or the lateral acceleration applied to the vehicle 11 is greater than a threshold. That is, in the example illustrated in FIG. 6A, the charging interruption information is not displayed on the head-up display 15 when the charging request level is "1" or "0" and the traveling state is "2", such as being in the acceleration traveling state. Namely, in acceleration/deceleration traveling or turn traveling, it is expected that the driver is concentrating on driving operation. In this situation, the charging interruption information is not displayed on the head-up display 15 in order not to disturb the driver.

Other Embodiments of Table Data

In the above description, as illustrated in FIGS. 6A to 6C, the method of displaying the charging interruption information is set based on the charging request level and the traveling state. However, the method is not limited to this. The displaying method may be set simply based on the charging request level or simply based on the traveling state. FIGS. 9A to 11C illustrate tables A to C of other embodiments. FIGS. 9A to 9C illustrate tables A to C that specify the displaying methods simply based on the charging request level. As described above, the charging interruption information is displayed in accordance with the first notification mode using the table A when the cause of interruption of charging is the first cause due to the traveling state. Moreover, the charging interruption information is displayed in accordance with the notification mode using the table B when the cause of interruption of charging is not determined as being the first cause or the second cause. Furthermore, the charging interruption information is displayed in accordance with the second notification mode using the table C when the cause of interruption of charging is the second cause due to a driver.

The tables A to C that specify the displaying methods simply based on the charging request level, as illustrated in FIGS. 9A to 9C, may be used. As illustrated in FIG. 9A, when the cause of interruption of charging is the first cause due to the traveling state, that is, when charging is interrupted without intention of a driver, the charging interruption information is notified in accordance with the first notification mode that uses the head-up display 15. On the other hand, as illustrated in FIG. 9C, when the cause of interruption of charging is the second cause due to a driver, that is, charging of the mobile device 100 is intentionally interrupted by the driver, the charging interruption information is notified in accordance with the second notification mode that does not use the head-up display 15. Thus, when charging is interrupted without intention of a driver, the charging interruption information is notified in a prominent manner, whereby it is possible to encourage the driver to move the mobile device 100 and to quickly resume charging of the mobile device 100. In contrast, when charging of the mobile device 100 is intentionally interrupted by the driver, the charging interruption information is notified in an unnoticeable manner without disturbing the driver.

As illustrated in the table A in FIG. 9A, in the first notification mode, which is executed when charging is interrupted without intention of a driver, the charging interruption information is displayed on the head-up display 15 when the SOC of the battery 103 is lower than a threshold. On the other hand, the charging interruption information is displayed on the meter display 13 when the SOC of the battery 103 is greater than a threshold. That is, the charging interruption information is displayed on the head-up display 15 when the SOC is low and charging of the mobile device 100 is recommended. On the other hand, the charging interruption information is displayed on the meter display 13 when the SOC is high and charging of the mobile device 100 is not urgent. Thus, the head-up display 15 and the meter display 13 are used properly in accordance with the SOC of the battery 103, whereby the charging interruption information is appropriately notified to the driver.

The tables A to C that specify the displaying methods simply based on the traveling state, as illustrated in FIGS. 10A to 10C, may also be used. As illustrated in FIG. 10A, when the cause of interruption of charging is the first cause due to the traveling state, that is, when charging is interrupted without intention of a driver, the charging interruption information is notified in accordance with the first notification mode that uses the head-up display 15. On the other hand, as illustrated in FIG. 10C, when the cause of interruption of charging is the second cause due to a driver, that is, charging of the mobile device 100 is intentionally interrupted by the driver, the charging interruption information is notified in accordance with the second notification mode that does not use the head-up display 15. Thus, when charging is interrupted without intention of a driver, the charging interruption information is notified in a prominent manner, whereby it is possible to encourage the driver to move the mobile device 100 and to quickly resume charging of the mobile device 100. In contrast, when charging of the mobile device 100 is intentionally interrupted by the driver, the charging interruption information is notified in an unnoticeable manner without disturbing the driver.

As illustrated in the table A in FIG. 10A, in the first notification mode, which is executed when charging is interrupted without intention of a driver, the charging interruption information is displayed on the head-up display 15 when the vehicle speed is greater than a threshold. That is, when the traveling state is "0" and is in the high-speed traveling state, the charging interruption information is displayed on the head-up display 15. Thus, the charging interruption information is displayed on the head-up display 15 in order to enable the driver to easily view it, because the field of view of the driver is narrowed in high-speed traveling. As a result, the charging interruption information is appropriately notified to the driver even in high-speed traveling.

The tables A to C that specify the displaying methods simply based on the traveling state, as illustrated in FIGS. 11A to 11C, may also be used. As illustrated in FIG. 11A, when the cause of interruption of charging is the first cause due to the traveling state, that is, when charging is interrupted without intention of a driver, the charging interruption information is notified in accordance with the first notification mode that uses the head-up display 15. On the other hand, as illustrated in FIG. 11C, when the cause of interruption of charging is the second cause due to a driver, that is, charging of the mobile device 100 is intentionally interrupted by the driver, the charging interruption information is notified in accordance with the second notification mode that does not use the head-up display 15. Thus, when charging is interrupted without intention of a driver, the charging interruption information is notified in a prominent manner, whereby it is possible to encourage the driver to move the mobile device 100 and to quickly resume charging of the mobile device 100. In contrast, when charging of the mobile device 100 is intentionally interrupted by the driver, the charging interruption information is notified in an unnoticeable manner without disturbing the driver.

As illustrated in the table A in FIG. 11A, in the first notification mode, which is executed when charging is interrupted without intention of a driver, the charging interruption information is not displayed on the head-up display 15 when acceleration applied to the vehicle 11 is greater than a threshold. That is, when the traveling state is "2", such as being in the acceleration traveling, the charging interruption information is not displayed on the head-up display 15. Namely, in acceleration/deceleration traveling or turn traveling in which the longitudinal acceleration or the lateral acceleration applied to the vehicle 11 is greater than a threshold, it is expected that the driver wants to concentrate on driving operation. In this situation, the charging interruption information is not displayed on the head-up display 15 in order not to disturb the driver.

It is needless to say that the disclosure is not limited to the foregoing embodiments and various modifications can be made thereto within the scope that does not depart from the gist thereof. Although the wireless charger 19 is placed at the center console 18 in the above description, the position of the wireless charger 19 is not limited thereto, and the wireless charger 19 can be placed at other position. Although acceleration/deceleration traveling and turn traveling are described as the situations in which the traveling state is set at "2" and it is expected that the driver wants to concentrate on driving operation, in the above description, other situation can also be included. For example, the traveling state may be set at "2", which is specified as described above, in a situation in which the outside air temperature is lower than the freezing point, because it is expected that the driver is concentrating on driving operation for fear of icy travel road surfaces.

Although the charging request level is determined based on the SOC of the battery 103 in the above description, the factor for the determination is not limited to this. For example, the charging request level may be determined based on the amount of power consumption of the mobile device 100. In this example, charging of the mobile device 100 is more recommended as the amount of power consumption of the mobile device 100 increases. Thus, when the amount of power consumption of the mobile device 100 is large, the charging request level is set at "2", which is specified as described above. In contrast, charging of the mobile device 100 is less urgent as the amount of power consumption of the mobile device 100 decreases. Thus, when the amount of power consumption of the mobile device 100 is small, the charging request level is set at "0", which is specified as described above.

Although the meter display 13 is used as the sub-display in the above description, the display is not limited to this, and the navigation display 17 may be used as the sub-display. In addition, although the phrase "Charging of the mobile device is interrupted" is exemplified as the charging interruption information in the above description, of course, the phrase is not limited to this, and other expression may be used. In addition to the charging interruption information, information such as the value of SOC, a charged time period, a residual time until charging is completed, or a charging retry frequency after charging is interrupted may be displayed on the meter display 13 or other display.

Although the information about the interruption of the charging of the mobile device 100 (that is, the charging interruption information) is notified to a passenger in a prominent manner by displaying it on the head-up display 15 in the above description, the notifying method is not limited thereto. Examples of the method for notifying the charging interruption information to a passenger in a prominent manner include displaying enlarged information, displaying a lot of information, displaying the information in a conspicuous color, and displaying the information in a blinking manner. In the case of making the information prominent by displaying a lot of information, the value of the SOC, the time when the charging is interrupted, or other information may be displayed in addition to the indication showing interruption of charging.

Although whether the turn traveling is performed is determined by using the lateral acceleration in the above description in determining the traveling state, the determination method is not limited thereto. The angular acceleration from the gyroscope sensor 34 or the steering angle from the steering angle sensor 35 may be used to determine whether the turn traveling is performed. In addition, although the various functional components 21 to 29 are provided in the controller 20 in the above description, the configuration is not limited thereto. One or more or all of the various functional components 21 to 29 may be provided in other controller.

In the above description, the probability that the driver has touched the mobile device 100 is determined by determining whether the face of a driver is turned to the wireless charger 19, based on result of image analysis sent from the monitoring unit 16. However, the determination method is not limited thereto. In one example, the possibility that the driver has touched the mobile device 100 may be determined as being low when the passenger in the vehicle is only the driver and the driver is holding a steering wheel by both hands. In another example, the possibility that the driver has touched the mobile device 100 may be determined as being high when self-driving control, such as adaptive cruise control, is executed and the driver is not holding the steering wheel by both hands. Whether the passenger is only the driver can be determined by using, for example, a seating sensor provided in a seat. In addition, the state of holding the steering wheel by the driver can be determined by using, for example, an electrostatic capacitance sensor, a piezoelectric sensor, or a torque sensor.

According to the embodiments of the disclosure, when the cause of interruption of charging is determined as being the first cause, the information about the interruption of the charging of the mobile device (that is, the charging interruption information) is notified to a passenger in a more prominent manner than when the cause of interruption of charging is determined as being the second cause. As a result, the charging interruption information can be appropriately notified to the passenger.

The invention claimed is:

1. A vehicle control apparatus to be provided in a vehicle comprising a wireless charger configured to charge a mobile device placed on the wireless charger, the vehicle control apparatus comprising:
   an interruption detector configured to detect interruption of charging of the mobile device by the wireless charger, on a basis of an operating state of the wireless charger;
   a cause determination unit configured to determine whether a cause of the interruption of the charging of the mobile device is a first cause or a second cause, the first cause being that the mobile device is moved by inertia during traveling of the vehicle, the second cause being that the mobile device is moved by a passenger; and
   a notification controller configured to, when the cause is determined as being the first cause, notify the passenger of information about the interruption of the charging of the mobile device in a more prominent manner than when the cause is determined as being the second cause.

2. The vehicle control apparatus according to claim 1, further comprising:
   a head-up display configured to display a virtual image in a field of view in front of the passenger, wherein
   when the cause is determined as being the first cause, the notification controller notifies the information about the interruption of the charging in accordance with a first notification mode that uses the head-up display, and
   when the cause is determined as being the second cause, the notification controller notifies the information about the interruption of the charging in accordance with a second notification mode that does not use the head-up display.

3. The vehicle control apparatus according to claim 2, wherein when acceleration applied to the vehicle is greater than a threshold, the cause determination unit determines the cause of the interruption of the charging of the mobile device as the first cause.

4. The vehicle control apparatus according to claim 2, further comprising:
   a camera configured to capture an image of a face of the passenger; and
   an image determination unit configured to determine whether the face of a passenger is turned to the wireless charger, on a basis of the image information from the camera, wherein
   when the face of the passenger is not turned to the wireless charger, the cause determination unit determines the cause of the interruption of the charging of the mobile device as the first cause.

5. The vehicle control apparatus according to claim 2, further comprising:
   a state of charge (SOC) determination unit configured to determine an SOC of a battery of the mobile device, wherein
   when the SOC is lower than a threshold in the first notification mode, the notification controller displays the information about the interruption of the charging on the head-up display.

6. The vehicle control apparatus according to claim 5, further comprising:
   a sub-display to be provided in an instrument panel, wherein
   when the SOC is greater than the threshold in the first notification mode, the notification controller displays the information about the interruption of the charging on the sub-display.

7. The vehicle control apparatus according to claim 2, wherein when a vehicle speed is greater than a threshold in the first notification mode, the notification controller displays the information about the interruption of the charging on the head-up display.

8. The vehicle control apparatus according to claim 2, wherein when acceleration applied to the vehicle is greater than a threshold in the first notification mode, the notification controller does not display the information about the interruption of the charging on the head-up display.

9. The vehicle control apparatus according to claim 1, wherein when acceleration applied to the vehicle is greater than a threshold, the cause determination unit determines the cause of the interruption of the charging of the mobile device as the first cause.

10. The vehicle control apparatus according to claim 1, further comprising:
    a camera configured to capture an image of a face of the passenger; and
    an image determination unit configured to determine whether the face of a passenger is turned to the wireless charger, on a basis of the image information from the camera, wherein
    when the face of the passenger is not turned to the wireless charger, the cause determination unit determines the cause of the interruption of the charging of the mobile device as the first cause.

11. A vehicle control apparatus to be provided in a vehicle comprising a wireless charger configured to charge a mobile device placed on the wireless charger, the vehicle control apparatus comprising circuitry configured to
    detect interruption of charging of the mobile device by the wireless charger, on a basis of an operating state of the wireless charger,
    determine whether a cause of the interruption of the charging of the mobile device is a first cause or a second cause, the first cause being that the mobile device is moved by inertia during traveling of the vehicle, the second cause being that the mobile device is moved by a passenger, and when the cause is determined as being the first cause, notify the passenger of information about the interruption of the charging of the mobile device in a more prominent manner than when the cause is determined as being the second cause.

\* \* \* \* \*